United States Patent
Gossett et al.

(10) Patent No.: US 6,333,743 B1
(45) Date of Patent: *Dec. 25, 2001

(54) METHOD AND APPARATUS FOR PROVIDING IMAGE AND GRAPHICS PROCESSING USING A GRAPHICS RENDERING ENGINE

(75) Inventors: Carroll Philip Gossett; Nancy Cam Winget, both of Mountain View, CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,537

(22) Filed: Oct. 23, 1997

(51) Int. Cl.$^7$ .................................................. G06F 15/16
(52) U.S. Cl. ..................... 345/503; 345/582; 345/608; 382/254
(58) Field of Search ..................................... 345/418, 419, 345/425–432, 501–503, 507, 199, 552, 561, 582, 589, 608, 609; 382/254, 260, 274, 305, 307

(56) References Cited

U.S. PATENT DOCUMENTS

| | | | |
|---|---|---|---|
| 5,303,172 | 4/1994 | Magar et al. | 708/406 |
| 5,355,443 * | 10/1994 | Kim et al. | 345/431 |
| 5,467,459 * | 11/1995 | Alexander et al. | 711/153 |
| 5,471,592 * | 11/1995 | Gove et al. | 709/213 |
| 5,684,981 | 11/1997 | Jones | 345/516 |
| 5,706,416 * | 1/1998 | Mann et al. | 345/427 |
| 5,710,876 * | 1/1998 | Peercy et al. | 345/426 |
| 5,724,599 * | 3/1998 | Balmer et al. | 712/43 |
| 5,740,344 | 4/1998 | Lin et al. | 345/430 |
| 5,742,353 * | 4/1998 | Yasuki et al. | 348/578 |
| 5,757,374 * | 5/1998 | Nakamura et al. | 345/525 |
| 5,790,134 * | 8/1998 | Lentz | 345/501 |
| 5,801,678 | 9/1998 | Huang et al. | 345/127 |
| 5,808,617 * | 9/1998 | Kenworthy et al. | 345/521 |
| 5,870,097 * | 2/1999 | Snyder et al. | 345/426 |
| 5,949,424 * | 9/1999 | Cabral et al. | 345/426 |
| 6,002,410 * | 12/1999 | Battle | 345/513 |
| 6,005,582 * | 12/1999 | Gabriel et al. | 345/430 |
| 6,021,423 | 2/2000 | Nag et al. | 708/622 |
| 6,111,584 * | 8/2000 | Murphy | 345/430 |

OTHER PUBLICATIONS

Akeley, K., "RealityEngine Graphics", Proceedings of the 20th Annual Conference on Computer Graphics, 1993, pp. 109–116.*

Barkans, A., "High Quality Rendering Using the Talisman Architecture", Proceedings of the 1997 SIGGRAPH/Eurographics Workshop on Graphics Hardware, 1997, pp. 79–88.*

Bastos, R., Goslin, M., Zhang, H., "Efficient Radiosity Rendering Using Textures and Bicubic Reconstruction", Proceedings of the 1997 Symposium on Interactive 3D Graphics, 1997, pp. 71–74.*

Peercy, M., Airey, J., Cabral, B., "Efficient Bump Mapping Hardware", Proceedings of the 24th Annual Conference on Computer Graphics and Interactive Techniques, 1997, pp. 303–306.*

* cited by examiner

*Primary Examiner*—Ulka J. Chauhan
(74) *Attorney, Agent, or Firm*—Sterne, Kessler, Goldstein & Fox P.L.L.C.

(57) ABSTRACT

A method an system provide that image processing operations and graphics processing are both performed by a graphics rendering system. The texture memory and a texture filter of the graphics rendering system are used to perform look-up table operations as well as multiply and accumulate operations typically associated with image processing.

13 Claims, 7 Drawing Sheets

INPUTS FOR 1
LERP ARRAY

```
 0  1  0  1  0  1  0  1
 2  3  2  3  2  3  2  3
 0  1  0  1  0  1  0  1
 2  3  2  3  2  3  2  3
 0  1  0  1  0  1  0  1
 2  3  2  3  2  3  2  3
```

☐ – $LOD_0$ TEXELS

⬚ – $LOD_1$ TEXELS

3x3: 2 PASSES

FIG. 8B

5x5: 5 PASSES

FIG. 8C

7x7: 8 PASSES

FIG. 8D

9x9: 13 PASSES

FIG. 8E

11x11: 18 PASSES

METHOD AND APPARATUS FOR PROVIDING IMAGE AND GRAPHICS PROCESSING USING A GRAPHICS RENDERING ENGINE

BACKGROUND OF THE INVENTION

The present invention is directed to a method and apparatus for performing image processing. More particularly, the present invention is directed to a method and apparatus which provide that image processing and graphics processing are both performed by a graphics rendering engine in a processing system.

Computer graphics are being used today to perform a wide variety of tasks. Many different areas of business, industry, government, education, and entertainment are tapping into the enormous and rapidly growing list of applications developed for today's increasingly powerful computer devices.

Graphics have also been used for communicating ideas, data, and trends in most areas of commerce, science, and education. Until recently, real time user interaction with three dimensional (3D) model and pseudo-realistic images was feasible on only very high performance workstations. These workstations contain dedicated, special purpose graphics hardware. The progress of semiconductor fabrication technology has made it possible to do real time 3D animation with color shaded images of complex objects, described by thousands of polygons, on powerful dedicated rendering subsystems. The most recent and most powerful workstations are capable of rendering completely life-like, realistically lighted 3D objects and structures.

In addition to the generation of graphics, there has been a continuing development in image processing. Examples of imaging applications include electronic light tables (ELTs) which can be used for defense imaging, two dimensional (2D) and 3D visualization techniques for medical imaging or in other markets where image processing can be critical, e.g., pre-press and post-production to name a few.

Figure 1:
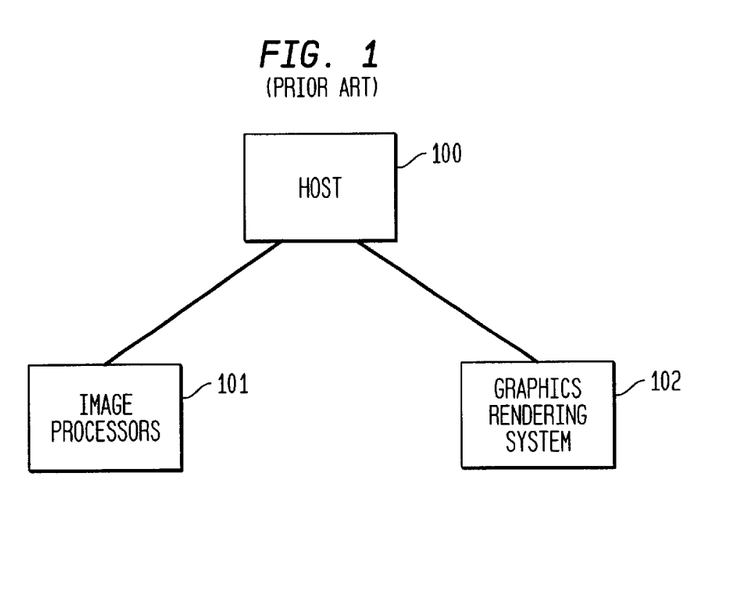
FIG. 1 illustrates a block diagram of a prior art system.

In the past, it has been thought that dividing the image processing functionality and the graphics processing functionality into separate dedicated hardware was an advantageous architecture. A simplified block diagram representing this prior art arrangement is shown in FIG. 1. As illustrated, it was believed that it was appropriate to have a unified system under the control of a host 100. However, the image processing operations were left to the image processors 101 while the graphics processing operations were left to graphics rendering system 102.

Figure 2:
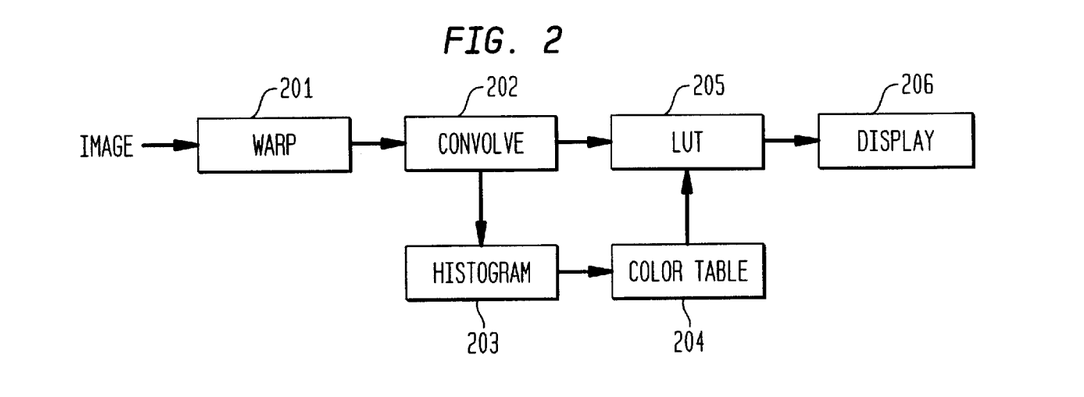
FIG. 2 illustrates, in block form, operation modules for image processing.

For the most part, image processing operations constitute basic multiply-and-accumulate operations. An example of how an image may require image processing operations is illustrated in FIG. 2. The process flow is one plausible sequence of image processing steps required by an ELT Application. The image is first warped by module 201. The warped image can then be convolved by module 202. The convolved image is subjected to a histogram operation by module 203. A color table is generated based on the resulting histogram and is then accessed in module 204. The color table and the output of the convolve operation are used in a look-up table module 205 to provide an appropriate output to a display module 206.

One such image processor is the Intel I860 which is a Digital Signal Processor (DSP) typically employed as a dedicated image engine independent of the host and graphics engine.

It would be beneficial if an architecture existed that eliminated the need for separate dedicated hardware for image processing.

SUMMARY OF THE INVENTION

The present invention provides an architecture in which image processing and graphics processing are both performed by a graphics rendering system. In particular, the graphics rendering system components are adapted to perform the multiply-and-accumulate functions typically performed by image processors. Furthermore, operations relating to look-up tables are performed using memory associated with the graphics rendering system.

In one embodiment of the present invention the graphics rendering system includes a texture memory and a texture filter. The texture memory can be used in look-up table operations in an image processing mode. Furthermore, arrays of linear interpolators in the texture filter can be adapted to provide multiply-and-accumulate functionality to perform such operations as convolutions, thereby providing pixel transformation capabilities.

In accordance with the present invention, the image processing operations can be performed by the same hardware used to provide graphics rendering thereby removing the need for dedicated image processing hardware.

DETAILED DESCRIPTION

Introduction

Figure 3:
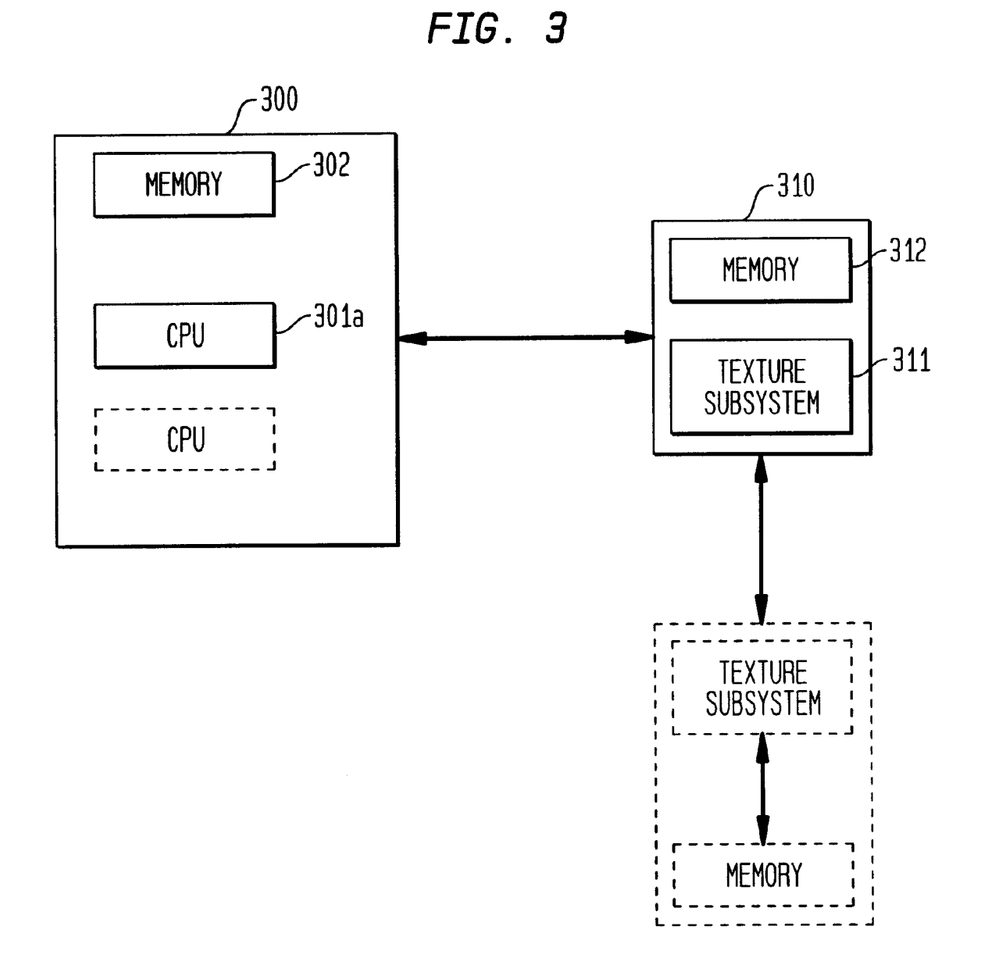
FIG. 3 provides a block diagram illustration of an embodiment of the present invention.

The invention provides that image processing and graphic processing are both performed in the graphics rendering system. A block diagram representing an embodiment of the invention is shown in FIG. 3. A host 300 includes at least one central processing unit (CPU) 301A and may include a plurality of CPUs. The host interfaces with a visualization subsystem 310 which includes a raster or texture engine or subsystem (hereinafter texture subsystem) 311 and memory 312. The memory can comprise any generic electronic memory device, such as SDRAM, and will hereinafter be referred to as the generic memory. The visualization subsystem includes an architecture, described below in relation to FIG. 5, for performing a core set of imaging operations as well as graphics operations. It is possible that multiple visualization subsystems could be coupled to the host 300 as shown.

It is helpful to understand how image data is typically transferred so as to understand how the embodiment of FIG. 3 can exploit the relationship between image processing and graphics processing.

Image data is typically transferred through such operations as drawing a pixel, reading a pixel, or copying a pixel, as well as through texture definitions. The source and destination of a pixel is dependent upon buffer definitions as well as the operation that is called, that is a draw operation, a read operation, a copy operation, or a texture load operation. In accordance with the invention, if any of the pixel modes are enabled then image data is processed through the graphics rendering system, more particularly through a texture filter and texture memory.

Figure 4:
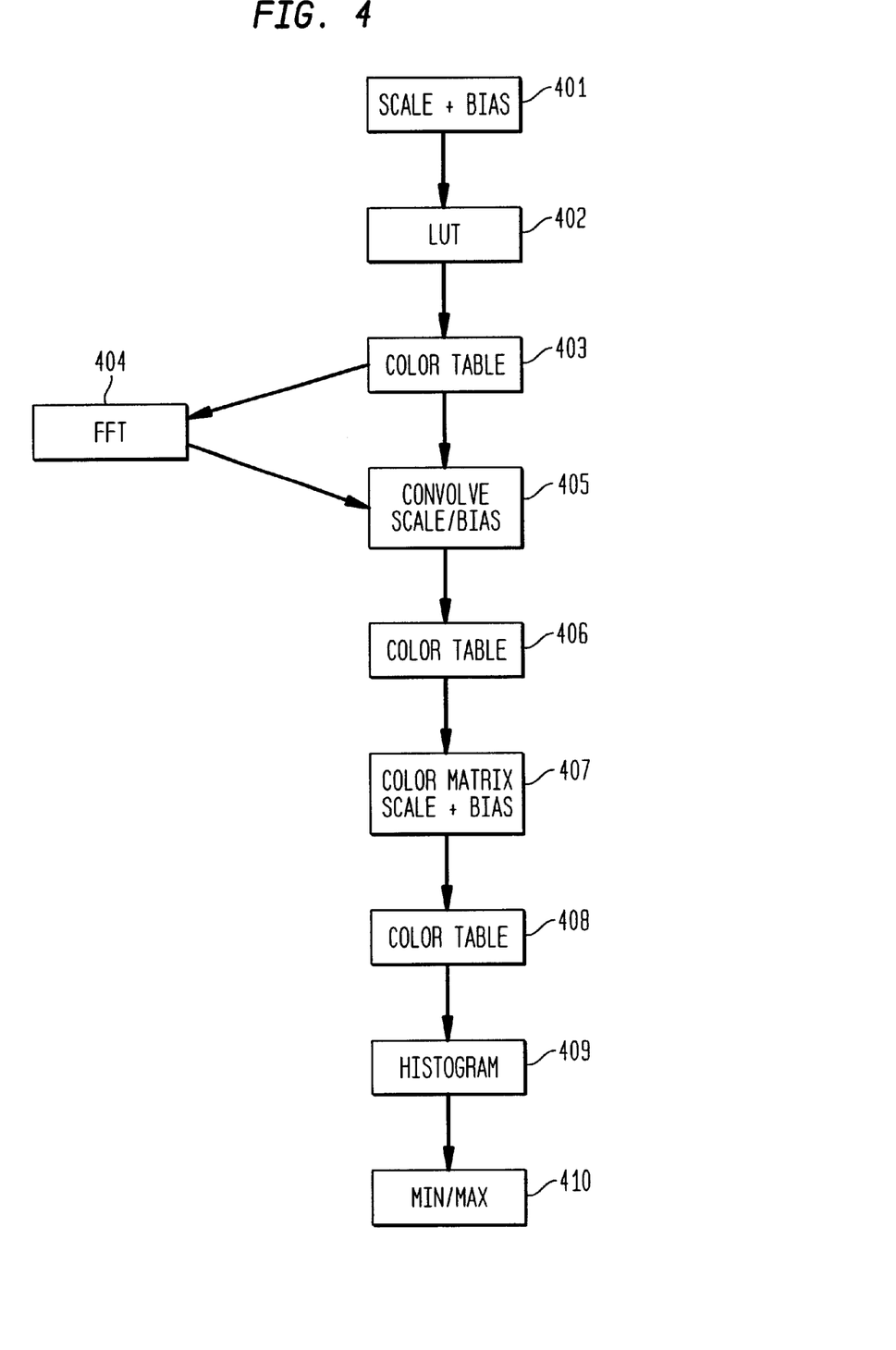
FIG. 4 provides an operations flow for image processing in the architecture of FIG. 3.
Figure 5:
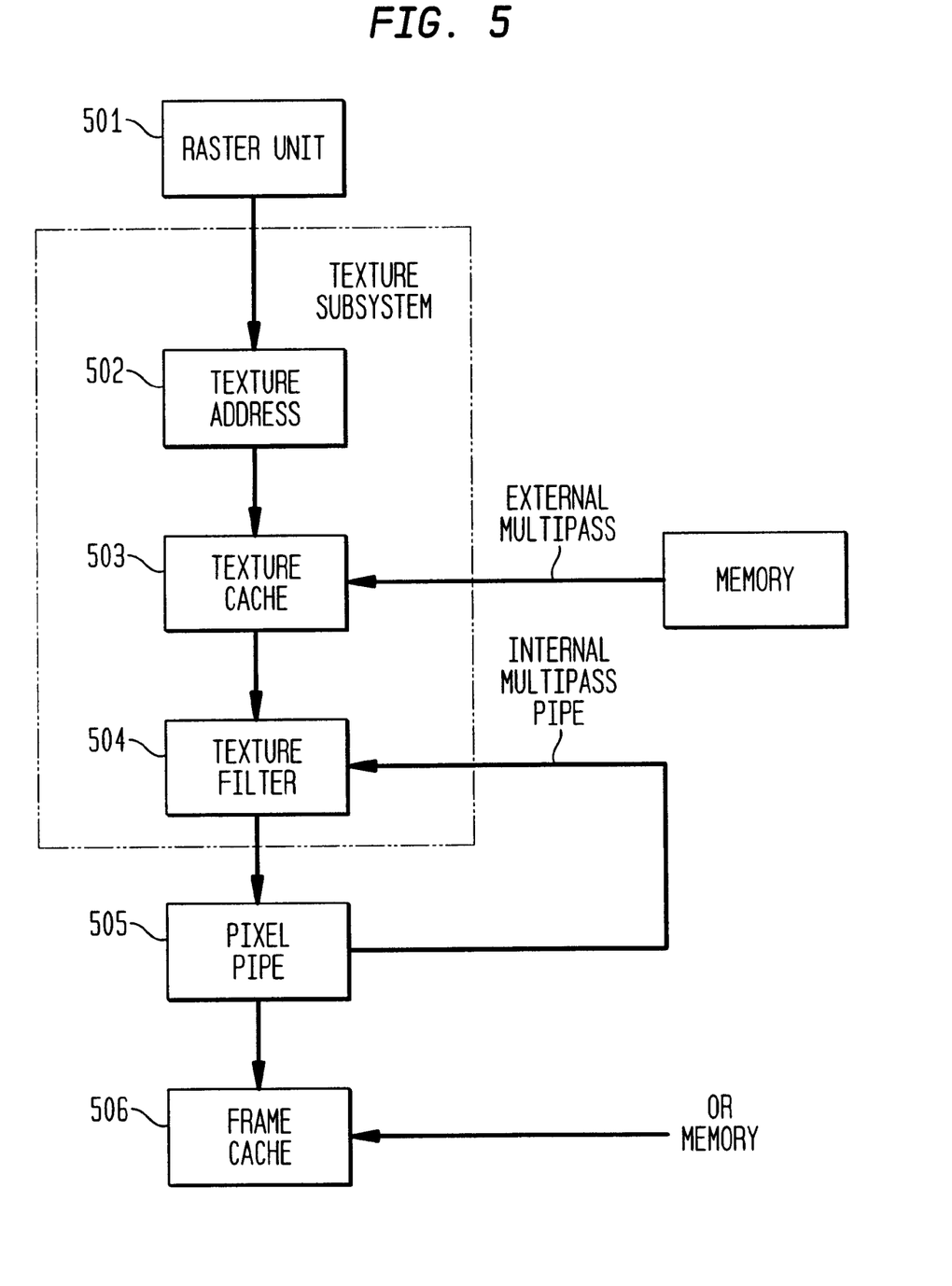
FIG. 5 provides a block diagram representation of modules relating to the architecture of FIG. 3.

FIGS. 4 and 5 illustrate a sample of pixel transfer modes as well as a block diagram representation of an architecture for the graphics rendering engine which can be utilized in connection with the pixel transfer modes.

The flow shown in FIG. 4 is somewhat similar to that shown in the block diagram of FIG. 2. An image can be subjected to a scale and bias operation 401. The result of that operation can then be used in a look-up table (LUT) operation in element 402. The look-up table can then be utilized in conjunction with the color table 403. The color table can then provide information to either a fast fourier transform (FFT) operation 404 or a convolve and scale and bias operation 405. A color table operation is then carried out in connection with module 406. A color matrix with scale and bias is the subject of module 407. Another color table operation is the subject of element 408. Then a histogram and minimum/maximum operation are performed in conjunction with modules 409 and 410 respectively.

Textures are stored in generic memory and faulted into the texture cache, 503 (see FIG. 5) as needed. Additionally, image data flows between the texture subsystem and generic memory as textures or buffers (of all flavors, e.g., frame buffers, pbuffers, or accumulation buffers). Since image operations are processed by the texture filter, they must be defined as textures. However, this is a looser definition of traditional textures in that, since all data is stored in a unified memory, so long as there is conformance to texture formats, it is possible to interchange buffers with textures when accessing them through the texture subsystem. That is, it is possible to allow the texture cache to fault in data even from other types of buffers. This can be important for obtaining optimal efficiency both in computation and storage.

Image data may be directed straight to generic memory by a command/format module (not shown) if there are no pixel transfer operations enabled. Like geometry, image data to be rendered is also passed through the raster unit (or onto the texture engine). This means that images are processed a quad at a time, that is four output pixels at a time. In one embodiment, the texture subsystem processes two pixels per clock and as a consequence a minimum of two clock cycles are required to process a quad of pixels.

From the raster unit, 501 of FIG. 5, output pixels are passed onto the texture subsystem and the pixel pipeline. Depending on the processing mode that is settable via a command interface, resulting pixels are either stored in a framebuffer cache, written back to memory or fed back to the raster unit for multipassing or for loading texture attributes through an attribute pipeline.

The block diagram of FIG. 5 shows the graphics rendering engine including the raster unit 501; a texture subsystem including: a texture address module 502, a texture cache 503, a texture filter 504; a pixel pipe 505; and a frame buffer cache 506. Lines are also shown representative of inputs for multipassing operations which will be described in greater detail later in the specification.

In summary, the operational elements of FIG. 4 can all be performable on the graphics engine or visualization subsystem whose representative architecture is shown in FIG. 5. As a consequence of the use of the visualization subsystem architecture with the modifications which will be described in greater detail below, it is possible to eliminate the use of dedicated image processing hardware such as DSPs or ASICs which otherwise increases system costs.

The remainder of the detailed description will provide further information regarding modules of the graphics rendering system and a description that maps individual image processing operations into the described graphics rendering architecture.

The Graphics Rendering Architecture

The image data flow relating to the architecture and the block diagram modules of that architecture has already been described above. However, further details regarding those modules and their interrelation to the image processing data flow are now presented.

The graphics rendering engine includes a command module (not shown) that processes commands and reformats pixels and texels coming in and going out of the texture subsystem. Especially for imaging, a set of attributes have been defined to allow for more flexibility and programmability of the texture subsystem. The set of attributes allow for specifying:

1. Destination of output pixels to memory or back to the texture filter;
2. Texel address computation—using (x,y) coordinates or the RGBA value at (x,y) to compute the (s, t) address.
3. Texel traversal direction (that is a row versus column).
4. Texture subsystem employment that is, using the texture subsystem for look-up operations or for filter operations.
5. Enabling multipassing.
6. Texture filter register specification-preloading specific alpha coefficients to the individual lerps.

Since the texture subsystem is programmable, the command module also keeps track of the current "state" of the command first-in first-out (FIFO) buffer stored in memory (e.g. 312). This enables invoking multipass loops through the texture subsystem. Depending on the command attribute set, it is possible to choose to multipass externally or internally. When multipassing externally, output pixels are fed back to generic memory and faulted back into texture cache. While multipassing internally, output pixels are fed directly back to the texture filter. Multipassing will be described in connection with the operations of imaging processing mapped onto this architecture.

The pixel transfer operations illustrated in FIG. 4 can all be performed in the texture subsystem. If any of the pixel transfer modes are enabled then data is passed through that subsystem.

The texture subsystem can be designed as a programmable engine that can be used to compute not just the resampling filters required by the graphics texture options, but to also support most of the imaging operations. There are four modes in which the texture subsystem can operate:

1. Default texturing—(x,y) coordinates are used to generate (s,t) coordinates;
2. Look-up from texture cache—the RGBA values at (x,y) coordinates are used to generate the (s,t) coordinates;
3. Texel traversal along the color dimension; and
4. Texel traversal along y,x-row/column dimension.

The texture subsystem includes the texture addressing unit, the texture cache and the texture filter as shown in FIG. 5.

Texture Addressing

The texture addressing unit (TA), shown as block 502 of FIG. 5, mainly determines what texels it must fetch from the cache. Pixels passed from the raster unit can be thought of as the output pixels used to generate the required texels to resample based on a settable mode.

In a default mode, the texture addressing unit uses the pixel coordinate (x,y,z) values to generate the texel address values. In a look-up mode, the texture addressing unit uses pixel RGBA values at a specified coordinate (x,y,z) to generate a texel address value.

In typical graphics texturing operation the texture addressing unit fetches texels from two textures, each texture representing a distinct level of detail (LOD). However, in the image processing case each LOD is the same. Therefore, the image is loaded or copied into the cache twice. These two LODs are then used in texture filtering or imaging operations.

To properly compute the required texels to fault into cache, the TA can also accept an offset pair, one per LOD. The default offset is (0,0), but can be changed per iteration or "passed" through the texture filter via the command interface.

Texture Filter

Figure 6:
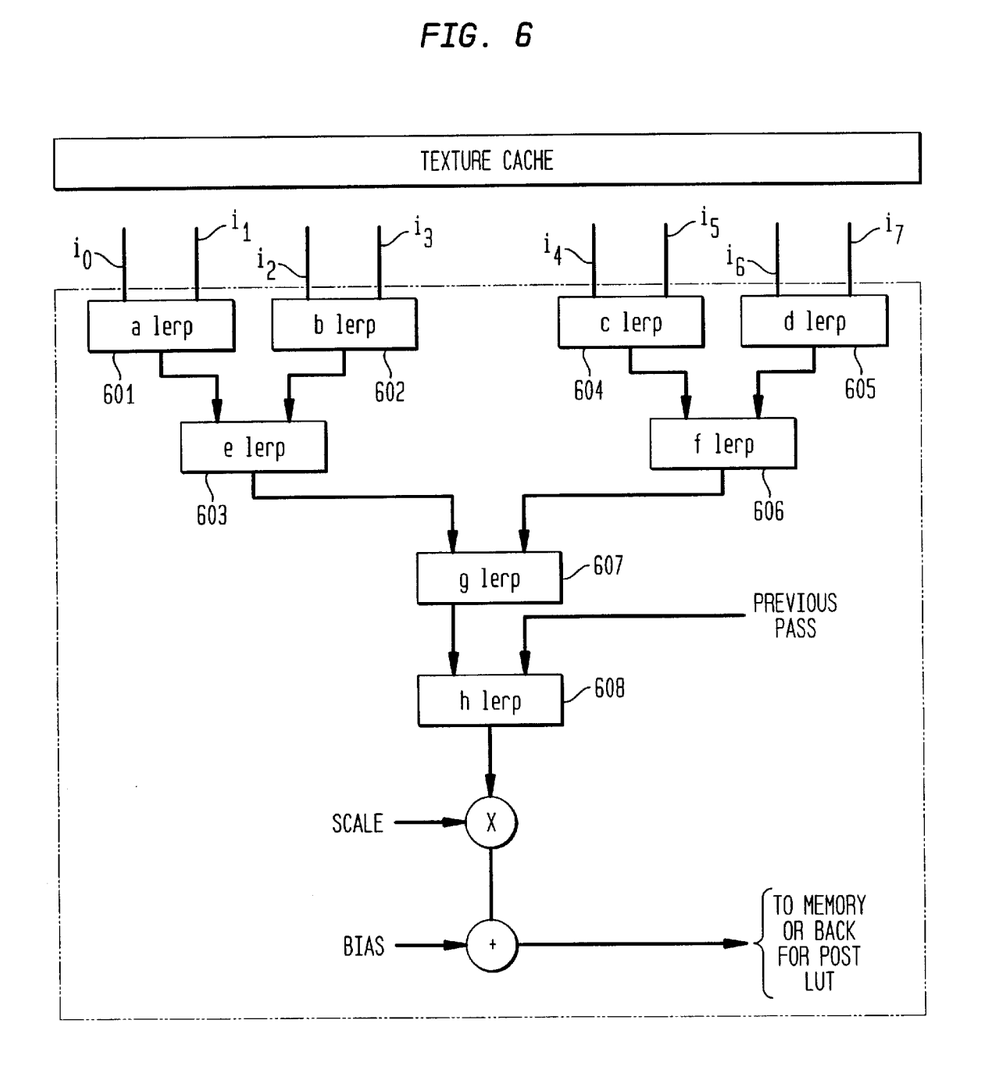
FIG. 6 illustrates an example of a texture filter of FIG. 5.

The texture filter provides a set of linear interpolation arrays. An example of such an array is shown in FIG. 6. In the illustrated example there are eight linear interpolators or lerps. This array of eight linear interpolators can constitute a tri-linear interpolator. Such interpolators are utilized extensively within the texture filter. As is well known in the art, a tri-linear interpolator includes seven linear interpolators such as "a" to "g" (601 to 607) in FIG. 6. Lerps a, b, and e (601, 602 and 603) form one bilinear interpolator. Lerps c, d, f (604, 605, 606) form another bilinear interpolator. Two bilinear interpolators combine with a common interpolator, here linear interpolator "g" (607) to form a tri-linear interpolator. Bilinear interpolators are used to interpolate texels in a 2D image. For example, linear interpolator "a" interpolates between input $i_0$ and input $i_1$. An interpolation ratio is determined by a "weight". An interpolation weight closer to 0.0 results in an interpolation output closer to $i_1$ while an interpolation weight closer to 1.0 results in an interpolation output closer to $i_0$. Each interpolation weight is referred to as a "lerp weight" and tri-linear interpolators are referred to as a "lerp tree". As is well known in the art bi-linear interpolation is conventionally used to interpolate between four texels to produce a blended color for a given fragment. Four texels which surround the s and t texture coordinates of interest are used to generate the texture color of each fragment. Two pairs of texels arranged in a 2×2 array, are each pair-wise interpolated horizontally to generate two new interpolates. These interpolates are then interpolated vertically to generate the final filtered texture color.

Tri-linear interpolation is used to interpolate between texels at different scales (that is level of detail). Thus, as is well known in the art, tri-linear interpolation interpolates between the output of two bi-linear interpolators. Hence the output of interpolator "e" and the output of interpolator "f" are interpolated by interpolator "g" to obtain a filtered color fragment. Thus a tri-linear interpolator is often referred to as a filter. Such filtering operations are the primary use of the hardware of the texture filter.

More specifically, the texture filter may provide a set of lerp arrays capable of computing the equivalent of eight normalized multiply-and-accumulate operations of some pre-determined bit length. To appropriately handle four pixels per two cycles, one design has a total of 16 lerp arrays, each set of 8 used to compute one RGBA pixel. The lerp arrays along the color component dimension can be combined to improve precision. However, when using the lerp array in higher precision it is possible to process only monochrome data. With respect to imaging, the tree of interpolators, typically used to perform tri-linear interpolation, can be thought of as a normalized multiply-and-accumulate tree that allows up to eight inputs to be multiplied with eight normalized alpha ($\alpha$) coefficients and accumulated at the end. By normalized it is meant that the alpha coefficients are positive values in the range from [0–1]. Each arithmetic element, or lerp, employs an alpha coefficient to interpolate between two given inputs (A and B) as shown in equation 1 (EQ 1).

$$A\alpha+(1-\alpha)B \qquad (EQ\ 1)$$

As indicated above, FIG. 6 illustrates one such lerp array. The inputs may be signed or unsigned, however all alpha coefficients must not only be positive (that is unsigned) but also be normalized. To compensate for this, there is some extra hardware to allow for the negation of the second input, B and for swapping inputs A and B. This takes on particular significance in connection with the convolution operation which will be described below.

The last lerp "h" (608) is typically used to interpolate between the current value and one computed from a previous pass. The alpha coefficient and input settings (negation and input swap) are all settable via the command interface. Each lerp array can be programmed independently through the command module.

Texels are fed into the lerp array from the texture cache. For each pixel there are 4 lerp arrays, one for each color (RGBA component). There are three ways in which texels are loaded:

1. Default texturing—RGBA texels are loaded into their corresponding lerp arrays with the column-dimension (x) being the fastest growing dimension;
2. Column order—RGBA texels are loaded into their corresponding lerp arrays with the row dimension (that is y) being the fastest growing dimension; and
3. Color addressing—each component of a texel, RGBA is loaded as the input into each of the lerp arrays. This is used to perform the color matrix operation.

The mapping of the imaging processing operations into the operation of the texture filter will be described in greater detail below.

Caches

The texture subsystem also provides cache memory. In one embodiment the texture subsystem provides 48K bytes of such memory.

Input image data is stored in memory and brought or faulted into the texture cache. As long as the data in memory conforms to the supported texture formats, it can be identified via the command module as a texture to be faulted into the texture cache (but can later be accessed as any other type of buffer). This obviates the need to provide redundant copies and the use of memory space as well as provides the required flexibility in using the texture subsystem as a pseudo-vector processor.

Data can be implicitly faulted into texture cache by the texture addressing module, or it can be explicitly loaded via the command interface. Typically, a tile of 16 texels is faulted into the cache. The footprint of this tile is dependent on the dimensionality and type of operation being performed. However, for look-up operations, the entire look-up table must be completely loaded into the cache.

To obtain maximum performance from the texture subsystem image operations are performed in a "mipmapping" addressing mode. This means that for each lerp array the texture addressing unit generates four inputs from one level of detail (LOD) and the remaining four inputs from the second LOD. The implication is that the system must redundantly load the input data into each LOD.

Figure 7A:
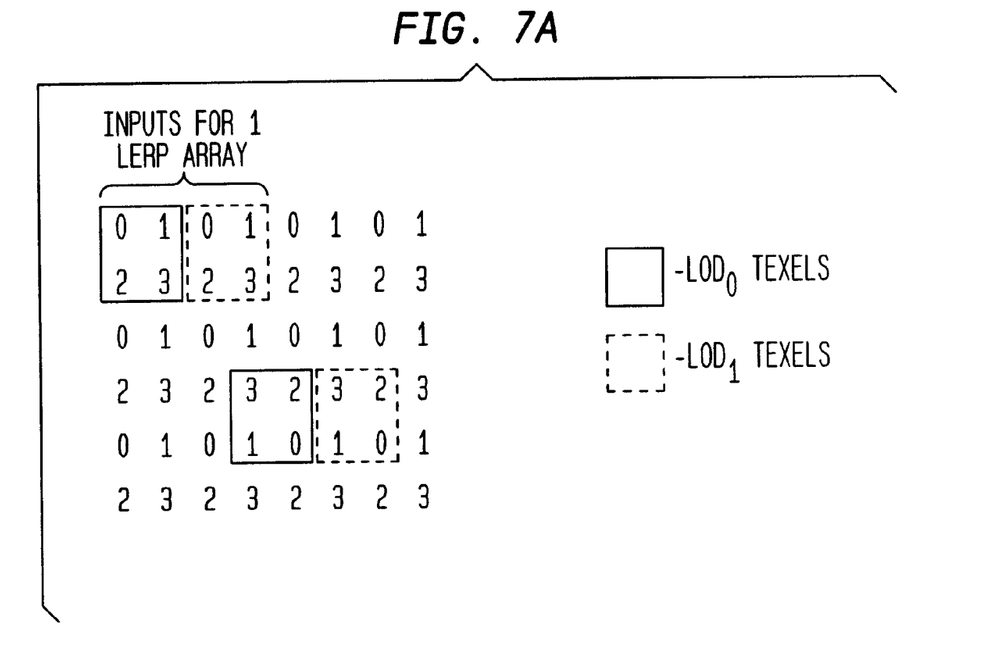
FIGS. 7A and 7B are arrays used to explain inputs to the filter of FIG. 6.
Figure 7B:
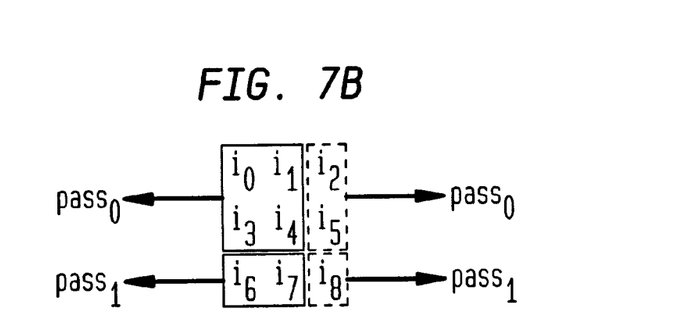
Figure 8A:
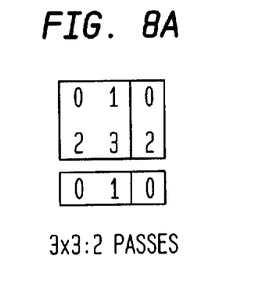
FIGS. 8A to 8E are arrays used to describe a multipass operation for use with the filter of the present invention.
Figure 8B:
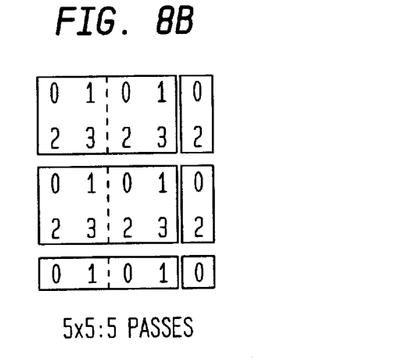
Figure 8C:
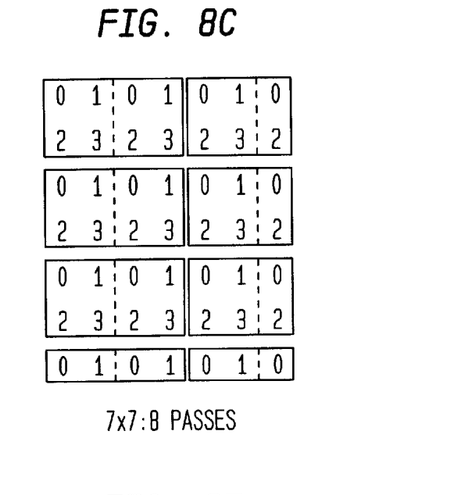
Figure 8D:
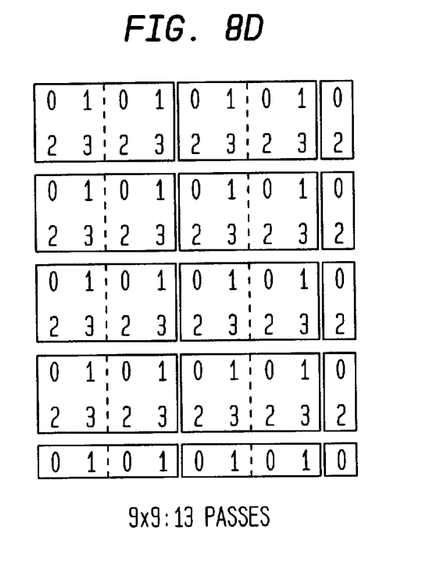
Figure 8E:
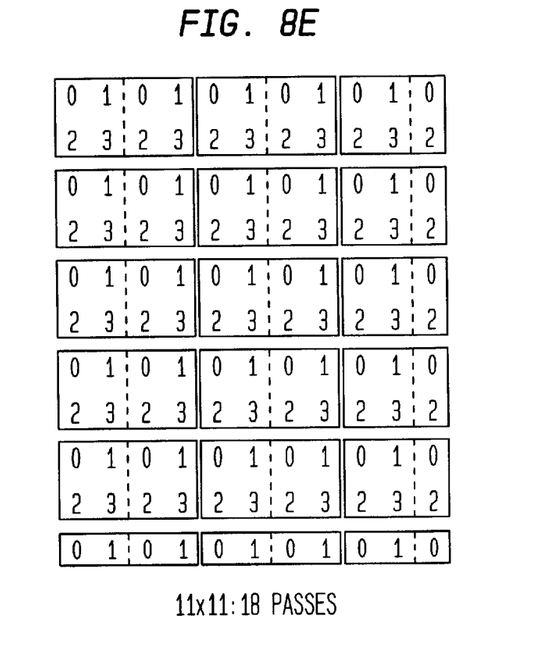

For 2D operations, when texels are extracted from texture cache they are extracted in a 2×2 footprint from each LOD. So, when computing the number of passes required to perform a 2D operation one must account for the notion that only a maximum of eight texels, four from each LOD are being extracted. This is shown in FIG. 7A. Since the inputs are coming from two sources, that is LODs, there can only be a maximum of eight inputs that can be accessed. For example, when trying to compute a 3×3 convolution, while there are a total of nine inputs, the texels can only be extracted as shown in FIG. 7B. It is possible to choose which direction to access the pixels by providing offsets for each LOD. In the example, in FIG. 7B the choice has been made to combine pixels from $LOD_0$, $(i_0,i_1,i_3,i_4)$ with pixels $(i_2, i_5,)$ from $LOD_1$ as inputs for $pass_0$. Thus, the address offsets for pass, would be (–1,0) and (1,0) for $LOD_0$ and $LOD_1$ respectively; for $pass_1$, the offsets are (–1,–1) and (1,–1). The offsets were computed based on a convolution operation, where the output pixel is centered at $i_4$; thus the origin or (0,0) offset is at $i_4$. The offsets per LOD for each pass are determined by the user through the command interface. Thus alternative pixels such as $(i_0, i_1, i_3, i_4)$ and $(i_6, i_7)$ could have been selected as inputs for $pass_0$.

For look-up tables, in order to avoid address aliasing between the two pixels, it is necessary to duplicate the look-up table so that each pixel is addressing a different table. To fully support 12-bit look up tables, the texture cache must have a minimum of 48K bytes. A 12-bit RGBA look-up table in texture cache requires four components× twelve bits×4096 entries×two pixels. So, when performing a look-up operation resulting in a 12-bit RGBA pixel, all of the texture cache must be allocated as look-up table.

An additional framebuffer cache can be used as another temporary repository for holding post (texture and pixel-pipe) processed data. This cache can potentially reduce the latency and overhead introduced by having to read/write/modify to memory.

Pixel Pipe

The pixel pipe provides the ability to blend and/or accumulate pixels. of particular importance, this is where it is expected to compute some of the dyadic operations such as add, subtract, and multiply images (even in the complex domain). Additionally, since in most imaging operations (like convolve) it is necessary to accumulate the results of each multi-pass, it is therefore possible to employ the accumulation logic of the pixel pipe module to accomplish the desired results.

Multipassing

As has been described above, the texture subsystem provides several ways in which to multipass to make more effective use of a lerp array as an eight-input multiply-and-accumulate processor. For instance, an internal multipass can be provided to effectively allow operations requiring more than eight inputs to be combined through the use of multiple passes. The resulting texel is immediately fed back to the texture filter as the second input to the h lerp of FIG. 6. Internal multipassing effectively allows the use of the lerp arrays, result to be fed to as the second input into the h lerp of the next immediate pass. An external multipass will store the resulting texel to memory and then faults it back into texture cache at either the next or some later pass. Each of these two modes are settable through the command interface.

Having further described the texture subsystem components the detailed description will now focus on the mapping of individual imaging operators into this architecture.

Mapping of Individual Imaging Operators

There are multiple imaging operations which can be performed with the texture subsystem described above. As described earlier, imaging operations such as those shown in FIG. 4 are desirable. The following subsections will describe how some of those various operations for example, convolutions, look-up tables, etc. are performed by the architecture described above.

Convolutions

This section describes how to convert the multiply coefficients from a general sense to the alpha values required for each lerp. While convolutions are used as the example, the mapping holds true regardless of the desired computation. However, each imaging operation will determine it's own pixel traversal and thus it's own multipassing derivation. The general (1D) convolution equation is expressed as:

$$C(x) = \sum_{h=0}^{M} I(h)K(x - h) \quad \text{(EQ 2)}$$

Whereas C denotes the convolved result, I is the input image and the K being kernel coefficients. Given this equation, one can now derive the alpha values used by the lerps in the texture filter based on the kernel values. Using the notation from FIG. 6 to represent the alphas for each corresponding lerp we can then extrapolate equivalences between the original kernel coefficients based on going through the lerp tree.

The original 8-tap 1D convolve is expressed as:

$$k_0i_0+k_1i_1+k_2i_2+k_3i_3+k_4i_4+k_5i_5+k_6i_6+k_7i_7 \quad \text{(EQ 3)}$$

Under the lerp tree, we would get:

$$\cfrac{\cfrac{\cfrac{ai_0 + (1-a)i_1}{e} + \cfrac{bi_2 + (1-b)i_3}{(1-e)}}{g} + \cfrac{\cfrac{ci_4 + (1-c)i_5}{f} + \cfrac{di_6 + (1-d)i_7}{(1-f)}}{(1-g)}}{h(\text{scale})}$$

To improve the precision in the case of convolutions, it is proposed not to use the last lerp h; thus in this notation, h is the ratio of the sum of the K's (that is lower the sum of the K's). The last step, for convolutions is to actually scale the output to denormalize the result. Equivalences between the K's and the alphas are formed by:

$k_0 = a \cdot e \cdot g \cdot h$ $k_1 = (1-a) \cdot e \cdot g \cdot h$ $k_2 = b \cdot (1-e) \cdot g \cdot h$ $k_3 = (1-b) \cdot (1-e) \cdot g \cdot h$ $k_4 = c \cdot f \cdot (1-g) \cdot h$ $k_5 = (1-c) \cdot f \cdot (1-g) \cdot h$ $k_6 = d \cdot (1-f) \cdot (1-g) \cdot h$ $k_7 = (1-d) \cdot (1-f) \cdot (1-g) \cdot h$ The above equations must also take into account that the lerp alpha values are normalized. Additionally, before one can extrapolate the alpha values for each lerp, one must also take into account for possible divide by zeros; these could be caused by either very sparse kernel matrices or negative coefficients that may cancel each other out (as is the case for some edge detectors). To compensate for these effects, it is necessary to work with the absolute values of each kernel coefficient and compensate by negating the input when its coefficient is negative. Given this, the lerp alphas can be derived to:

$$a = \frac{|k_0|}{|k_0| + |k_1|}$$

$$b = \frac{|k_2|}{|k_2| + |k_3|}$$

$$c = \frac{|k_4|}{|k_4| + |k_5|}$$

$$d = \frac{|k_6|}{|k_6| + |k_7|}$$

$$e = \frac{|k_0| + |k_1|}{|k_0| + |k_1| + |k_2| + |k_3|}$$

$$f = \frac{|k_4| + |k_5|}{|k_4| + |k_5| + |k_6| + |k_7|}$$

$$g = \frac{|k_0| + |k_1| + |k_2| + |k_3|}{|k_0| + |k_1| + |k_2| + |k_3| + |k_4| + |k_5| + |k_6| + |k_7|}$$

The last lerp, h, can be used to accumulate the current $$h = |k_0| + |k_1| + |k_2| + |k_3| + |k_4| + |k_5| + |k_6| + |k_7|^{**}$$

results with the previous pass. However, because it is interpolating as opposed to simple accumulating, it must take into account the contributions of the previous passes (if we were chaining the passes, i.e., doing an internal multipass). Thus, the h for pass j would really be represented as:

$$h_j = \frac{\sum |k_j|}{\prod_{i=j}^{n}(1 - h_i)} \quad \text{(EQ 4)}$$

Where j is the current pass, $h_i$ is the alpha value for pass i, n is the total number of passes and the sum of $|K_j|$ is the magnitude (or sum) of all of the kernel coefficients corresponding to pass j. A better alternative may be to bypass the last lerp, and use the accumulation logic provided in the pixel pipe. This ensures better precision and leaves the h alpha value as an expression dependent solely on the coefficients of the current pass. Again, because these values are normalized, a pre-processing step that is required with this alternate approach is that we must first normalize the K's before performing the conversions and scale back to denormalize on the last pass.

As stated earlier, to compensate for negative kernel coefficients, we can negate the inputs based on the following:

neg B for lerp a=sign (k0) xor sign (k1)
neg B for lerp b=sign (k2) xor sign (k3)
neg B for lerp c=sign (k4) xor sign (k5)
neg B for lerp d=sign (k6) xor sign (k7)
neg B for lerp e=sign (k1) xor sign (k3)
neg B for lerp f=sign (k5) xor sign (k7)
neg B for lerp g=sign (k3) xor sign (k7)
sign of scale factor=sign (k7)

The texture filter can also swap inputs A and B if necessary. For instance, if $k_0$ is negative (and $k_1$ positive), the A input must be negated. So, for the a lerp, it is necessary to swap inputs and negate B.

Since there are only 8-inputs into each lerp array, it is necessary to multipass whether internally or externally to fully compute a 2D convolve whose kernel is bigger than a 4×2 (or 2×4). To determine the number of passes required for any given 2D convolution, one must consider the addressing footprints imposed by the texture cache. Remember, one can choose any set of 2, 2×2 blocks that can be accessed from one of the two LODs. FIGS. 8A to 8E demonstrate how to determine the number of passes required for the currently supported 2D convolutions.

The blocks in FIGS. 8A to 8E demonstrate a possible addressing block per pass; each block represents a single pass and the dashed line represents breaks in the blocks into plausible addressing into each of the two LODs. The general formula for computing the number of passes required for a 2D convolution can be expressed as:

$$number\_of\_passes = ceil\left(\frac{ceil(row - size/2) \times ceil(col - size/2)}{2}\right) \quad \text{(EQ 5)}$$

where row_size and col_size are the row and column dimensions of the 2D kernel.

Look Up Tables

Lookup operations exercise the texture addressing (TA) and texture cache modules of the texture subsystem. The TA module determines the address into texture cache (i.e., the lookup table) based on the color value at coordinate (x,y,z). The output of the lookup operation can then be sent to the pixel pipe.

Color Matrix

The color matrix implementation is based on OpenGL's color_matrix extension. That is, one performs a 4×4 matrix operation on an rgba value:

$$\begin{bmatrix} R \\ G \\ B \\ A \end{bmatrix} = \begin{bmatrix} m_0 & m_1 & m_2 & m_3 \\ m_4 & m_5 & m_6 & m_7 \\ m_8 & m_9 & m_{10} & m_{11} \\ m_{12} & m_{13} & m_{14} & m_{15} \end{bmatrix} \begin{bmatrix} r \\ g \\ b \\ a \end{bmatrix} \quad \text{(EQ 6)}$$

The result requires a 4-input multiply and accumulate for each color component. For instance, to compute the red component, R:

$$R = m_0 r + m_1 g + m_2 b + m_3 a$$

Using a single lerp array, the above equation only requires 4 out of the 8 inputs, permitting the effective disablement of half of the lerps and use of only the a, b, e, g, and h lerps. Thus, the mapping of m's to alpha lerps (using the same scheme as that of convolves) becomes:

$$a = \frac{|m_0|}{|m_0| + |m_1|}$$

$$b = \frac{|m_2|}{|m_2| + |m_3|}$$

and also, it is necessary to keep track of the negative coefficients and input swaps:

neg B for lerp a=sign ($m_0$) xor sign ($m_1$)
neg B for lerp b=sign ($m_2$) xor sign ($m_3$)
neg B for lerp 3=sign ($m_1$) xor sign ($m_3$)

Since e must also be less than 1, the {$m_0$, $m_1$, $m_2$, $m_3$} coefficients can be normalized prior to performing the conversion. A scale can be applied at the end of the lerp array to denormalize the result. If the normalization is done, then obviously e would be 1.0

The above set of equations is the derivation for computing the R component. The derivation for the G,B, and A is the same, it is only necessary to substitute the m's to correspond to the respective color components. Using the command interface, each set of alpha lerp coefficients (and neg and swap states) are fed into each of the pixels color component lerp arrays.

Notice also that the inputs must be the actual color components of the texel as opposed to a sequence of texels. This requires that the data from texture cache be traversed along the color dimension vs. the (x,y) dimension. This is a settable mode that should be explicitly set as an attribute through the command interfaced.

SUMMARY

The above detailed description presents an architectural design for a graphics rendering system that can perform both graphics rendering and imaging processing. The texture subsystem including the texture cache and cache filter are used to provide buffering and multiply-and-accumulate operations which are utilized in imaging processing operations. Examples of how the texture subsystem architecture can be adapted to perform such imaging operations has also been presented. It should be recognized by those skilled in the art that the above description provides an example of an embodiment of the present invention in which imaging processing capabilities are incorporated into the graphics rendering subsystem. Alternative hardware and/or software adaptations could be utilized to achieve this end and still remain with in the scope of the applicants' invention.

What is claimed is:

1. A method for providing image processing in a computing system that includes a graphics rendering engine and a plurality of arrays of linear interpolators (lerp arrays), the method comprising the steps of:

determining an image processing operation is to be performed;

adapting the graphics rendering engine to process image data in accordance with the determined image processing operation, wherein said adapting step comprises the step of selecting coefficients for one of the plurality of lerp arrays in accordance with the determined image processing operation; and executing the determined image processing operation with the adapted graphics rendering engine.

2. The method of claim 1 wherein the graphics rendering engine includes a texture memory and a texture filter; and wherein said step of executing the determined image processing operation includes, performing a look-up operation with respect to said texture memory; and performing image pixel transformation using said texture filter.

3. The method of claim 2 wherein said texture filter includes the plurality of arrays of linear interpolators (lerp arrays), and wherein said step of performing image pixel transformation uses the selected coefficients.

4. The method of claim 1, wherein the determined image processing operation is a convolution; wherein said determining step comprises the step of determining the convolution is to be performed;

said adapting step comprises the step of adapting the graphics rendering engine to process image data in accordance with the convolution;

said adapting step comprises the step of selecting coefficients for one of the plurality of lerp arrays in accordance with the convolution; and said executing step comprises the step of executing the convolution with the adapted graphics rendering engine.

5. The method of claim 1, wherein the determined image processing operation is a color matrix operation; wherein said determining step comprises the step of determining the color matrix operation is to be performed;

said adapting step comprises the step of adapting the graphics rendering engine to process image data in accordance with the color matrix operation;

said adapting step comprises the step of selecting coefficients for one of the plurality of lerp arrays in accordance with the color matrix operation; and said executing step comprises the step of executing the color matrix operation with the adapted graphics rendering engine.

6. A system for providing both digital image processing and graphics rendering, the system comprising:

a memory;

an engine coupled to said memory, said engine used for both graphics rendering and image processing, wherein said engine comprises a plurality of arrays of linear interpolators (lerp arrays);

a host computer;

an interface; and software that selects coefficients for one of said plurality of lerp arrays to enable the performance of an image processing operation;

wherein said memory acts as a texture memory for graphics rendering and the same said memory that acts as a texture memory is an image memory for image processing and said host selects said rendering engine to perform either image processing or graphics rendering.

7. The system of claim 6 wherein said rendering engine includes:

a raster unit;

a texture memory; and a texture filter.

8. The system of claim 7 wherein said memory can be used to compute a look-up-table operation for image processing.

9. The system of claim 8 wherein said texture filter comprises the plurality of arrays of linear interpolators (lerp arrays).

10. The system of claim 6, wherein the image processing operation is a convolution.

11. The system of claim 6, wherein the image processing operation is a color matrix operation.

12. The system of claim 6, wherein said interface is a host computer interface.

13. The system of claim 6, wherein said interface is a rendering engine interface.

* * * * *